United States Patent
Bartley et al.

(10) Patent No.: US 8,476,384 B2
(45) Date of Patent: Jul. 2, 2013

(54) OLEFIN ACRYLATE EMULSION COPOLYMERIZATION

(75) Inventors: Stuart L. Bartley, Wickliffe, OH (US); James D. Burrington, Gates Mills, OH (US); Shui-Jen Raymond Hsu, Westlake, OH (US); Naser Pourahmady, Solon, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 258 days.

(21) Appl. No.: 12/808,380

(22) PCT Filed: Dec. 15, 2008

(86) PCT No.: PCT/US2008/086786
§ 371 (c)(1),
(2), (4) Date: Jun. 16, 2010

(87) PCT Pub. No.: WO2009/082640
PCT Pub. Date: Jul. 2, 2009

(65) Prior Publication Data
US 2010/0280198 A1    Nov. 4, 2010

Related U.S. Application Data

(60) Provisional application No. 61/015,989, filed on Dec. 21, 2007.

(51) Int. Cl.
*C08F 2/04* (2006.01)
*C08F 118/02* (2006.01)
*C08L 31/00* (2006.01)

(52) U.S. Cl.
USPC .............................. 526/89; 526/319; 524/556

(58) Field of Classification Search
USPC ...................................... 526/89, 319; 524/556
See application file for complete search history.

(56) References Cited

FOREIGN PATENT DOCUMENTS

| EP | 559150 A1 | * | 9/1993 |
| EP | 0559150 A1 | | 9/1993 |
| GB | 1458248 A | * | 12/1976 |
| WO | 2007/113180 A1 | | 3/2007 |
| WO | WO 2007113180 A1 | * | 10/2007 |

* cited by examiner

*Primary Examiner* — Michael M Bernshteyn
(74) *Attorney, Agent, or Firm* — Samuel B. Laferty

(57) ABSTRACT

A polymerization process to copolymerize hydrophobic ethylenically unsaturated $C_4$-$C_{30}$ olefins with polar monomers such as acrylates is described. The process utilizes an acid source to modify/catalyze the reactivity of the polar monomer and/or radically activated repeat unit from the polar monomer to promote incorporation of the ethylenically unsaturated olefin. The copolymer shows excellent adhesion to a variety of polymeric and/or polar substrates such as polyolefins, acrylate coatings, wood, etc.

15 Claims, No Drawings

OLEFIN ACRYLATE EMULSION COPOLYMERIZATION

CROSS REFERENCE TO RELATED APPLICATION

This application claims priority from PCT Application Serial No. PCT/US2008/86786 filed on Dec. 15, 2008, which claims the benefit of U.S. Provisional Application No. 61/015,989 filed on Dec. 21, 2007.

FIELD OF INVENTION

The field is the copolymerization of non-polar $C_4$-$C_{30}$ ethylenically unsaturated aliphatic olefins with monomers containing electron withdrawing groups such as acrylates. The copolymerization rates of such polar acrylates and nonpolar olefin monomers are modified, by the use of a Brönsted or Lewis acid that is believed to complex either the polar monomer or the repeating unit from the polar monomer when it is the free radical chain end. The polymerization media is preferably aqueous, which is a non-conventional media for Brönsted and Lewis acid catalyzed polymerizations. The resulting copolymer is a stable emulsion or dispersion of polymer particles in aqueous media.

BACKGROUND OF THE INVENTION

The free radical polymerization of olefins and polar monomers such as acrylates in nonaqueous media using Brönsted or Lewis acids as catalysts is well known. Generally, such polymerizations result in low molecular weight polymers or oligomers that have some tendency to alternate between the nonpolar olefin and the polar monomer, often an acrylate. Typically, water is meticulously removed before the Brönsted or Lewis acid is added to the polymerization because of the reactivity between the acid and water.

Ethylenically unsaturated olefins without heteroatom substitution typically have low copolymerization rates with polar monomers such as acrylates. The copolymerization technology of, olefins with polar monomers is reviewed in WO 03/070783 and WO 2005/054305 both owned by PPG Industries Ohio, Inc. The olefins are described as electron donating type monomers and the acrylates are described as electron accepting monomers. Styrene copolymerization with maleic anhydride is discussed in WO 03/070783 in paragraph [0002] and described as forming charge transfer complexes and resulting in some alternating sequences. Styrene is a somewhat nonpolar monomer that does readily copolymerize with acrylates and other polar monomers by free-radical mechanisms even in the absence of charge complexation. While styrene does contribute to a more hydrophobic acrylate polymer, the resulting polymers have high glass transition temperature(s) and are not useful for many applications where soft-flexible film formation is desired. Therefore, there is a desire to have more hydrophobic olefins copolymerize with acrylates and other polar co-monomers to form moderate to low glass transition temperature polymers for use in many ink, adhesive, and coating applications.

In WO 03/070783, Examples A and B of the copolymers they feed 3 or 4 different charges into a reaction vessel over several hours maintaining a temperature of 140-160° C. and pressures from 5 psi to 62 psi in Example A and 40 to 360 psi in Example B. Molecular weights were number averages of 2293 and 4274 while the weight averages were 8317 and 12,856 gram/mole. These copolymers were blended with more conventional latexes and made into curable film forming compositions.

In WO 2005/054305, Examples 1-4 were 25/20155 w/w/w/ of isobutylene/hydroxypropyl acrylate/butyl acrylate polymerized into a copolymer by the method of the patent application. The monomers and di-t-amyl peroxide were prepared in three separate feed tanks and commingled in a teed line just prior to addition to the 5-gallon stirred reactor. The reactor was maintained between 200 and 210° C., at a pressure of 500 psi for a residence time of 16 to 25 minutes. The resulting polymer was reported to have a composition of 21 wt. % isobutylene, 27 wt. % hydroxypropyl acrylate, and 52 wt. % butyl acrylate. The copolymer was reported to have number average molecular weights between 1446 and 1699 and weight average molecular weights between 2781 and 3441 g/mole.

It would be desirable to copolymerize ethylenically unsaturated olefins of 4 to 30 carbon atoms with polar monomers such as acrylate monomers in large commercial reactors in aqueous media at 1 or 2 atmosphere pressure. It is also desired to make polymers over 50,000 molecular weight, preferably over 100,000 molecular weight to obtain optimum desired properties.

SUMMARY OF THE INVENTION

A polymeric reaction product resulted from polymerizing a) at least one ethylenically unsaturated aliphatic olefin with 2 or 4 to 30 carbon atoms with b) at least one ethylenically unsaturated monomer containing an electron withdrawing group, and c) optionally other ethylenically unsaturated monomers forming a copolymer comprising repeating units within the same copolymer from said at least one aliphatic olefin and said at least one monomer containing electron withdrawing group(s) in a media containing some water (also referred to as an aqueous media if appropriate) with a free radical initiator source in the presence of a Lewis or Brönsted acid. This polymeric reaction product is a stable emulsion of organic particles in aqueous media with good film formation properties. A film from the polymeric reaction product was found to have many desirable properties such as variable glass transition temperature, good barrier properties with respect to water and solvents, and a relatively hydrophobic surface. The resulting copolymer was unexpected as the experimentally measured reactivity ratios between olefins and such polar monomers indicate that copolymers should be disproportionately rich in the polar monomer. Further, the olefins are not strong electron donating monomers and the monomers containing electron withdrawing groups of the disclosure generally are not strong electron accepting monomers that would form charge complexes such as is known for styrene-maleic anhydride.

DETAILED DESCRIPTION OF THE INVENTION

Prior acrylate coatings provide many attractive performance properties, including good film-forming properties, balance of hard/soft (glass transition), adhesion to polar substrates (wood, metal, paper, polyester, nylon, ABS, concrete, etc.), oil resistance (with acrylonitrile added as monomer), and some moisture resistance by adding styrene monomer. Some elasticity and hydrophobicity can be produced with butadiene monomer, but, this generally results in poorer UV resistance. However, it is difficult to obtain other desirable properties, including moisture resistance with soft coatings, adhesion to low surface energy substrates such as PP (polypropylene) or PE (polyethylene), resistance to polar solvents and acid/base media, barrier properties to oxygen, low coefficient of friction (COF) including soft touch without stickiness, low temperature flexibility, and resistance to dirt pickup and certain stains.

To address these latter properties, it is necessary to incorporate hydrophobic (hydrocarbon-like aliphatic olefin(s)) components into the polymer. Some conventional ways of doing this include the use of acrylate esters of long chain alcohols, such as 2-ethylhexyl acrylate, or esters of versatates, such as dodecyl versatate, the use of an olefin/acrylate compatibilizer such as polymeric surfactants and the use of a fatty acid chain transfer agent. These methods increase cost and are limited by the amount of hydrophilic component that can be incorporated.

The direct incorporation of aliphatic olefin into the acrylate polymer backbone provides the potential for a low cost, versatile method for achieving the properties of a hydrophobically modified acrylate polymer coating. Although such a process has been a subject of study by polymer chemists for many years, these efforts have met with limited success. Many of these are reviewed in U.S. Patent Application 2005/0113515 A1 (May 26, 2005), which is equivalent to WO 05/54305 described in the Background of the Invention.

A further limitation of these methods is that they are in general performed in solution in homogeneous media resulting in low molecular weight and low physical and mechanical integrity. Most commercial acrylate polymers are made by heterogeneous aqueous emulsion processes that in general yield polymers with high molecular weight and superior physical and mechanical properties. This disclosure describes a free-radical initiator/acid catalyst system (optionally utilizing a solid particulate acid that can be removed after polymerization) that can co-polymerize olefins and acrylates in aqueous media in conventional acrylate copolymerization reactors at more conventional acrylate polymerization temperatures and pressures.

The solid or soluble versions of Lewis or Brönsted acids are part of the catalyst system with an aqueous media polymerization process (optionally emulsion), wherein the free radical initiator is selected from any known to those in this art, including peroxides (e.g., dibenzoylperoxide), hydroperoxides (e.g., t-butylhydropemxide), persulfates (e.g., sodium persulfate) or azo compounds (e.g., azobisisobutyronitrile, AIBN), redox initiator systems, and mixtures of these conventional free radical initiators. The monomers (which will be described later in more detail) are independently selected from:
a) an ethylenically unsaturated aliphatic alpha olefin, including but not limited to isobutylene, diisobutylene, nonene, or any other olefin containing a terminal olefin group,
b) at least one ethylenically unsaturated monomer containing an electron withdrawing group, alternatively described as an ethylenically unsaturated monomer containing a carbonyl or nitrogen group, such as an acrylate acid or ester including acrylic acid, methyl acrylate or ethyl acrylate, 2-ethylhexylacrylate, or any normal or branched alkyl acrylate with an alcohol component of 1 to 32 carbon atoms, and
c) optionally methacrylic acid or ester, styrene, acrylonitrile, vinyl chloride, vinyl amide or any other free-radically-polymerizable, olefin, and/or an electron rich olefin, including vinyl ethers or esters.

More specifically, in one embodiment, the solid acid component can be any solid containing Lewis or Brönsted acid groups. Examples of solid Brönsted acids are acidified clays (e.g., Engelhard F-24, superfiltrol or Sud-Chemie Tonsil® catalysts), sulfonated styrene divinylbenzene copolymers (Rohm and Haas Amberlyst® catalysts), heteropolyacids such as phosphotungstic acid ($H_3PW_{12}O_{40}$), fumed silica, silica/aluminas or zeolites. Examples of Lewis acids include any transition metal compound that is soluble or dispensable in the emulsion media, (including naphthenates of Fe, Co, Ni, Mn, Cr, or Mo) or solid or solid supported versions containing transition metal ions such as $Fe_2O_3$ on alumina, or any of the above-mentioned soluble or dispersable transition compounds on a solid support such as montmorilinite (Bentonite) clays, silca, alumina, silica-aluminas and the like.

In another embodiment, liquid or water soluble Lewis or Brönsted acids (to the extent that they are inherently or can be made to be stable in the presence of water or in an aqueous media) can be selected from those disclosed in the prior art. Liquid or soluble Lewis or Brönsted acids (when stable in a media containing water) may be difficult to remove and may contribute to degradation or color in the polymer, which may be undesirable. Examples of liquid or water soluble Lewis or Brönsted acids include free radically polymerizable acids such as monomers containing carboxylic acid, phosphonic acid, sulfonic acid, etc., such as acrylic acid, itaconic acid, maleic acid, AMPS (acrylamide(2-methyl propane sulfonic acid) (available from Lubrizol Advanced Materials, Inc. in Cleveland, Ohio), etc. In one embodiment, the pKA value of the Lewis or Brönsted acid source is less than 6. In some limited embodiments, it may be desirable to exclude from the copolymer or reaction product (e.g., claim as free of, substantially free of, or having less than 100, 50, 25, 10, 5, 2, or 1 ppm based on the weight of all monomers to the polymerization recipe) either monomers containing acid groups (e.g., containing any of sulfonic, carboxylic, and phosphonic acid) or individually exclude using the same values the sulfonic, carboxylic, or phosphonic acid containing monomers.

DEFINITIONS

Unless otherwise indicated, the following terms have the following meanings:

As used herein, the term "wt. %" means the number of parts by weight of monomer per 100 parts by weight of polymer or copolymer on a dry weight basis, or the number of parts by weight of ingredient per 100 parts by weight of specified composition.

As used herein, the term "molecular weight" means number average molecular weight unless otherwise specified.

"Bulk polymerization" means the formation of polymer from substantially undiluted monomers. Incidental amounts of solvents, coalescents, plasticizers and/or water may also be present. Further description is given in "Bulk Polymerization", Vol. 2, pp. 500-514, *Encyclopedia of Polymer Science and Engineering,* © 1989, John Wiley & Sons, New York, the disclosure of which is incorporated herein by reference.

"Solution polymerization" means a polymerization technique in which both the monomers and resultant polymer are substantially soluble in a diluent (e.g., organic solvents, coalescents, plasticizers and/or water) that is also present. It is described in "Solution Polymerization", Vol. 15, pp. 402-418, *Encyclopedia of Polymer Science and Engineering,* © 1989, John Wiley & Sons, New York, the disclosure of which is incorporated herein by reference.

"Dispersion polymerization" means a polymerization technique in which polymerization of the monomers is at least initially carried out by bulk or solution polymerization, with the reaction system thereafter being emulsified or dispersed in an aqueous medium. It includes polymerization reactions in which polymerization is carried out to substantial or total completion before the bulk or solution polymerization system is dispersed in the aqueous medium. It is also known as secondary dispersion.

"Emulsion polymerization" means a polymerization technique in which the monomers are emulsified in an aqueous medium often containing a water-soluble initiator. Polymerization occurs predominantly in micelles formed by surfactant and not in the initially formed monomer droplets. Not to be bound by theory, the monomer droplets are thought to serve as a reservoir of monomers which diffuse out to find micelles and swell them. This mechanism produces polymer particles which are significantly smaller than original monomer droplets.

"Polymer" means a chemical substance consisting of one or more repeating units characterized by the sequence of one or more types of monomer derived units (monomer residues) and comprising a simple weight majority of molecules containing at least 3 monomer derived units which are covalently bound to at least one other monomer derived unit or other reactant. Such molecules can be distributed over a range of molecular weights and can be characterized by number-average and/or weight-average molecular weights and polydispersity index.

"Suspension polymerization" means a polymerization technique in which the monomers, normally together with an organic-soluble initiator, are first emulsified in an aqueous medium and thereafter the monomers are caused to polymerize. Because an organic-soluble initiator, is used, polymerization occurs throughout the bodies of the emulsified monomer droplets rather than in micelles, as in the case of emulsion polymerization. The result is that the polymer particles formed are typically larger than the polymer particles formed by emulsion polymerization.

The ethylenically unsaturated aliphatic olefin monomer(s) that are copolymerized with the polar monomers using the Brönsted or Lewis acid of this disclosure are unsaturated olefins with in one embodiment from 2 to 30 carbon atoms, in another embodiment from 4 to 30 carbon atoms, and in third, embodiment desirably 5 to 30 carbon atoms. They include branched and cyclic olefins but in preferred embodiments do not include styrenic monomers where the aliphatic nature is concluded after the first two carbon atoms of the ethylene unsaturation. In one embodiment, the formula of these molecules is $CH_2=CR'R''$ where $R'$ is a linear or branched $C_1$ to $C_{28}$ alkyl that may be linear, branched or cyclic and $R''$ is hydrogen or a linear or branched alkyl as set forth for $R'$, with the proviso that $R'$ and $R''$ together, have no more than 28 carbon atoms. Examples of ethylenically unsaturated aliphatic olefins include butylene, isobutylene, diisobutylene, pentene, hexane, octane, dodecene and other linear and branched olefins.

Free-Radical Polymerizable Monomers.

Examples of free radical polymerizable monomers which are useful in forming the copolymers of this invention include acrylic esters, methacrylic esters, unsaturated nitriles, styrenic monomers, vinyl esters, vinyl ethers, conjugated dienes, olefins, halogenated (e.g., vinyl chloride and vinylidene chloride), allyl and other monomers, and mixtures thereof. The preferred ethylenically unsaturated monomers for achieving copolymerization with the ethylenically unsaturated aliphatic olefins in the presence of a Brönsted or Lewis acid are those with electron withdrawing groups or including carbonyl or nitrogen containing groups such as the acrylates, ethylenically unsaturated monomers with carboxylic acid groups such as acrylic acid, nitrite monomers such as acrylonitrile, vinyl amides, etc. Desirably, the monomers with the electron withdrawing groups are, characterized by the electron withdrawing group having a sigma σ (inductive component) value from 0.1 to 0.9 according to Bromilow et al., J. Org, Chem., 44, 4755 (1979). Later listed monomers that do not meet the definitions for achieving copolymerization with ethylenically unsaturated aliphatic olefins are listed as optional monomers to provide other properties to the copolymer(s). The list of monomers below includes some monomers that may have basic functional groups that interact unfavourably with the Lewis or Brönsted acids (possibly forming salts). It is anticipated that one skilled in the art would use such monomers with basic functional groups in such a way or in such limited amounts as not to interfere with the function of the Lewis or Brönsted acid in catalyzing the copolymerization of the ethylenically unsaturated olefin of 4 to 30 carbon atoms with the polar carbonyl containing monomer.

Specific examples include acrylic esters and methacrylic acid esters having the formula I:

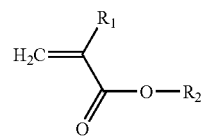

wherein $R_1$ is hydrogen or a methyl group, and $R_2$ contains about 1 to 100 carbon atoms, more typically 1 to 50 or 1 to 25 or 32 carbon atoms, and optionally, also one or more sulfur, nitrogen, phosphorus, silicon, halogen or oxygen atoms. Examples of suitable (meth)acrylate esters include methyl (meth)acrylate, ethyl(meth)acrylate, n-propyl(meth)acrylate, n-butyl(meth)acrylate, isopropyl(meth)acrylate, isobutyl (meth)acrylate, tert-butyl(meth)acrylate, n-amyl(meth)acrylate, n-hexyl(meth)acrylate, isoamyl(meth)acrylate, 2-hydroxyethyl(meth)acrylate, 2-hydroxypropyl(meth)acrylate, 4-hydroxybutyl(meth)acrylate, N,N-dimethylaminoethyl (meth)acrylate, N,N-diethylaminoethyl(meth)acrylate, t-butylaminoethyl(meth)acrylate, 2-sulfoethyl(meth)acrylate, trifluoroethyl(meth)acrylate, glycidyl(meth)acrylate, benzyl (meth)acrylate, allyl(meth)acrylate, 2-n-butoxyethyl(meth) acrylate, 2-chloroethyl(meth)acrylate, sec-butyl-(meth)acrylate, tert-butyl(meth)acrylate, 2-ethylbutyl(meth)acrylate, cinnamyl(meth)acrylate, crotyl(meth)acrylate, cyclohexyl (meth)acrylate, cyclopentyl(meth)acrylate, 2-ethoxyethyl (meth)acrylate, furfuryl(meth)acrylate, hexafluoroisopropyl (meth)acrylate, methallyl(meth)acrylate, 3-methoxybutyl (meth)acrylate, 2-methoxybutyl(meth)acrylate, 2-nitro-2-methylpropyl(meth)acrylate, n-octyl(meth)acrylate, 2-ethylhexyl(meth)acrylate, 2-phenoxyethyl(meth)acrylate, 2-phenylethyl(meth)acrylate, phenyl(meth)acrylate, propargyl(meth)acrylate, tetrahydrofurfuryl(meth)acrylate, norbornyl(meth)acrylate, acrylamide and its derivatives, and tetrahydropyranyl(meth)acrylate. Mixtures of acrylic and methacrylic acid esters may be used. The polymerized acrylic and methacrylic acid esters typically may comprise up to 50, 75, 90 or 95 wt. % of the copolymer, depending on the amount of ethylenically unsaturated olefin desired in the copolymer.

Unsaturated nitrile monomers include acrylonitrile or an alkyl derivative thereof, the alkyl preferably having from 1 to 4 carbon atoms, such as acrylonitrile, methacrylonitrile, and the like. Also suitable are unsaturated monomers containing a cyano group such as those having the formula II:

$$CH_2=C(R)CO(O)CH_2CH_2CN \qquad (II)$$

wherein R is H or $C_nH_{2n+1}$ and n is 1 to 4 carbon atoms. Other examples of unsaturated nitrile monomers include $CH_2=C$ (CN)$_2$, CH$_3$—CH=CH—CN, NC—CH=CH—CN, 4-pentenenitrile, 3-methyl-4-pentenenitrile, 5-hexenenitrile, 4-vinyl-benzonitrile, 4-allyl-benzonitrile, 4-vinyl-cyclohexanecarbonitrile, 4-cyanocyclohexene, and the like. Mixtures of the unsaturated nitriles may also be used. Acrylonitrile and methacrylonitrile are preferred. In some embodiments, the polymerized unsaturated nitrile monomers typically may comprise no more than about 60 wt. %, more typically no more than 20%, 15 wt. %, 10 wt. %, 5 wt. % or 3 wt. % of the copolymer.

The "styrenic monomers" useful in preparing the hydrophilic polymer(s) of this invention may be defined as monomers containing a carbon-carbon double bond in the alpha-position to an aromatic ring. For the purpose of this disclosure styrenic monomers will be considered neither to be ethylenically unsaturated aliphatic olefins nor ethylenically unsaturated monomers with electron withdrawing groups. Notwithstanding styrenic monomers may be included as co-monomer(s) in making the copolymers of this invention. Examples of suitable styrenic monomers include styrene, alpha-methylstyrene, tertiary butylstyrene, ortho, meta, and para-methylstyrene, ortho-, meta- and para-ethylstyrene, o-methyl-p-isopropylstyrene, p-chlorostyrene, p-bromostyrene, o,p-dichlorostyrene, o,p-dibromostyrene, ortho-, meta- and para-methoxystyrene, indene and its derivatives, vinyl-naphthalene, diverse vinyl(alkyl-naphthalenes) and vinyl (halonaphthalenes) and mixtures thereof, acenaphthylene, diphenylethylene, and vinyl anthracene. Mixtures of styrenic monomers also may be used. Styrene and alpha-methylstyrene are preferred. In some embodiments where the repeating units from styrene type monomers are undesirable, the polymerized styrenic monomers typically may comprise no more than about than 80%, 60 wt. %, 40 wt. %, 20 wt. %, 10 wt. % or 5 wt. % of the copolymer.

Vinyl ester monomers derived from carboxylic acids containing 1 to 100, more typically 1 to 50 or 1 to 25, carbon atoms also may be useful in preparing the vinyl polymer of the present invention. Examples of such vinyl ester monomers include vinyl acetate, vinyl propionate, vinyl hexanoate, vinyl 2-ethylhexanoate, vinyl octanoate, vinyl pelargonate, vinyl caproate, neo esters of vinyl alcohol, vinyl laurate, vinyl versatate and the like, as well as mixtures thereof. The polymerized vinyl ester monomers, typically may comprise from 0 wt. % to about 99.5 wt. % of the vinyl polymer of the present invention.

Vinyl ethers may be useful in preparing the copolymer of the present invention. Examples of vinyl ethers include methyl-, ethyl-, butyl, iso-butyl vinyl ethers and the like. In one embodiment, the polymerized vinyl ether monomers typically may comprise from 0 wt. % to about 60 wt. %, preferably from 0 wt. % to about 50 wt. %, of the vinyl polymer of the present invention.

Conjugated diene monomers containing 4 to 12 carbon atoms, and preferably from 4 to 6 carbon atoms, also may be useful in preparing the polymer of the present invention. Examples of such conjugated diene monomers include butadiene, isoprene, pentadiene, and like, as well as mixtures thereof. Butadiene is preferred. As expressed earlier, diene monomers contribute to UV light sensitivity and possibly accelerate polymer degradation under UV light. Thus, in some embodiments where UV light will be present, the copolymers have less than 50, more desirably less than 30, more desirably less than 10 or 20, and preferably less than 5 wt. % repeating units from diene monomers.

Olefin monomers outside the definition of ethylenically unsaturated aliphatic olefins containing 4 to 30 carbon atoms may also be useful in preparing the vinyl polymer of the present invention. Examples of such olefins include ethylene and propylene, as well as mixtures thereof. Cyclic olefins may also be used such as vinyl cyclohexane, cyclopentene, cyclohexene, cyclooctadiene, norbornene, norbornadiene, pinene and like. In one embodiment, the copolymer may typically be comprised from 0 or 1 wt. % to about 50 wt. %, from 0 or 1 wt. % to about 20 or 30 wt. %, or from 0 wt. % to about 5 or 10 wt. %, of repeating units from ethylene, propylene or cyclic olefin monomers.

Ethylenically unsaturated monomers comprising fluorine, chlorine, bromine, and iodine may be useful in preparing the copolymer of the present invention. They may contain 2 to 100 carbon atoms and at least one halogen atom. Examples of such monomers include vinyl fluoride, vinyl chloride, vinyl bromide, vinylidene fluoride, vinylidene chloride, halogenated (meth)acrylic and styrenic monomers, allyl chloride and like, as well as mixtures thereof. Sometimes halogenated monomers or their repeating units are sensitive to degradation catalyzed by Lewis or Brönsted acids. Thus, in some embodiments, the copolymer of this invention will comprise less than 50 wt. %, more desirably less than 20 or 30 wt. % and more desirably still less than 5 or 10 wt. % of halogenated repeating units from these monomers.

Polar and Hydrophilic Monomers.

Another group of monomers which are useful in preparing the copolymers of the present invention are polar monomers such as hydroxyalkyl(meth)acrylates, (meth)acrylamides and substituted (meth)acrylamides, sodium styrene sulfonate and sodium vinyl sulfonate, N-vinyl-2-pyrrolidone, caprolactam, 2-hydroxyethyl(meth)acrylate, 2-hydroxypropyl(meth)acrylate, 4-hydroxybutyl(meth)acrylate, (4-hydroxymethylcyclohexyl)-methyl(meth)acrylate, acrolein, diacetone (meth)acrylamide, 1-(2-((2-hydroxy-3-(2-propenyloxy)propyl)amino)ethyl)-2-imidazolidinone, N-methylol (meth)acrylamide, diallyl phosphate, Sipomer® WAM, WAM II (from Rhodia) and other urido-containing monomers, dimethylaminoethyl(meth)acrylate, and dimethylaminopropyl (meth)acrylamide, acrylic acid, methacrylic acid, crotonic acid, maleic acid, itaconic acid, citraconic acid, maleic anhydride, itaconic anhydride, citraconic anhydride, acrylamido (2-methyl propane sulfonic acid), and vinyl phosphonic acid. Mixtures of polar monomers also may be used.

Hydrophilic Monomers and Components.

Hydrophilic components monomers, chain transfer agents, initiators) have at least one hydrophilic, ionic or potentially ionic group is optionally included in the copolymer to assist dispersion of the polymer, thereby enhancing the stability of the dispersions so made. Typically, this is done by incorporating a compound bearing at least one hydrophilic group or a group that can be made hydrophilic e.g., by chemical modifications such as neutralization or deblocking) into the polymer chain. These compounds may be of a non-ionic, anionic, cationic or zwitterionic nature or the combination thereof.

For example, anionic groups such as carboxylate, sulfate, sulfonate, phosphate, and phosphonate can be incorporated into the polymer in an inactive form and subsequently activated by a salt-forming compound, such as ammonia, organic amines and alkali metal hydroxides. Other hydrophilic compounds can also be reacted into the polymer backbone, including lateral or terminal hydrophilic ethylene oxide, the organic amines and polyamine/polyimines previously described as chain extenders for polyurethanes, pyrrolidone or ureido units.

Hydrophilic compounds of particular interest are those which can incorporate acid groups into the polymer such as ethylenically unsaturated monomers having at least one carboxylic acid group, and preferably one or two carboxylic acid groups. Examples of such monomers include acrylic acid, methacrylic acid, itaconic acid, maleic acid, maleic anhydride, fumaric acid, crotonic acid, vinyl acetic acid, mesaconic acid, citraconic acid, 2-acrylamido-2-methylpropanesulfonic acid, styrene sulfonic acid, 2-sulfoethyl(meth) acrylate, alkali metal salts of the above acids and amine or ammonium salts thereof such as sodium allyl sulfonate, sodium 1-allyloxy-2-hydroxypropane sulfonate (COPS 1), 2-acrylamido-2-methyl propane sulfonate (AMPS), sodium dodecyl allyl sulfosuccinate (TREM-LF40), sodium methallyl sulfonate, sodium styrene sulfonate, sodium vinyl sulfonate, sodium vinyl phosphonate, sodium sulfoethyl methacrylate.

Strong acid monomers are also desirable in the copolymer. Examples of ethylenically unsaturated strong acid monomers useful according to the invention include, but are not limited to, 2-acrylamide-2-triethylpropane sulfonic acid, 1-allyloxy-2-hydroxypropane sulfonic acid, vinylsulfonic acid, styrene sulfonic acid, alkyl allyl sulfosuccinic acid, sulphoethyl (meth)acrylate, phosphoalkyl(meth)acrylates such as phosphoethyl methacrylate (phosphate ester of 2-hydroxyethyl methacrylate), phosphoethyl acrylate, phosphopropyl(meth) acrylate, phosphobutyl(meth)acrylate, phosphate ester of polyethyleneglycol(meth)acrylate, phosphate ester of polypropyleneglycol(meth)acrylate, phosphoalkyl crotonates, phosphoalkyl maleates, phosphoalkyl fumarates, phosphodialkyl(meth)acrylates, phosphodialkyl crotonates, vinyl phosphonic acid (VPA) and allyl phosphate. Salts of these unsaturated strong acid monomers are also useful. Diesters and blends of monesters and diesters of the phosphate strong acids are useful also. The term "(meth)acrylate," and the like, as used throughout means either an acrylate, or a methacrylate, or mixtures of both. In a preferred embodiment, the ethylenically unsaturated strong acid monomer is a phosphorous-containing monomer, and especially an unsaturated phosphate ester such as phosphoethyl methacrylate (phosphate ester of 2-hydroxyethyl methacrylate).

Compounds/Monomers Having at Least One Crosslinkable Functional Group.

Compounds having at least one crosslinkable functional group can also be incorporated into the vinyl polymers of the present invention, if desired. Examples of such compounds include N-methylol acrylamide (NMA), diacetone acrylamide (DAAM), acetoacetoxy ethyl methacrylate (AAEM), epoxy-containing compounds, —OH containing compounds, —COOH containing compounds, isocyanate-containing compounds (TMI), mercaptan-containing compounds, compounds containing olefinic unsaturation and the like. Mixtures can also be used.

Following polymerization of the ethylenically unsaturated aliphatic olefin with the at least one ethylenically unsaturated monomer containing an electron withdrawing group, it is often desirable to reduce the volatile organic content (VOC) of the polymerization product so that downstream products from the polymer dispersion can be formulated to be compliant with various volatile organic component limitations imposed by regional governments. By VOC, according to the present invention, it is meant the sum of the residual monomers and additional volatile organic compounds (e.g., diluents and degradation products) which are determined by the chromatographic gas method. While VOC may have a different definition by different groups, a preferred definition from the *European Union Directive* 2004/42/CE for VOC emissions from varnish defines VOC as an organic compound having an initial boiling point less than or equal to 250° C. measured at a standard atmospheric pressure of 101.3 kPa. As defined hereunder; more precisely the total VOC according to the present invention is desirably lower than 600, 500, 200, 100, 20, or 10 ppm and in particular the monomers, which are substances sometimes toxicologically harmful, lower than 500, 200, 100, 50, 20, or 10 ppm. A low VOC is typically less than 500 ppm, more preferably less than 250 ppm and most preferably less than 50 ppm. There are commercial methods or technology for removing volatile organics and residual monomers such as steam stripping, coagulation and washing or drying, etc. Removing VOCs soon after polymerization also avoids more restrictive shipping and storage requirements that might be required if more significant amounts of volatile and potentially flammable organics are present in the headspace of partially filled containers, tanks, trucks, etc.

Other Additives for the Polymer.

Other additives well known to those skilled in the art can be used in combination with the copolymer. Such additives include stabilizers, defoamers, antioxidants (e.g., Irganox™1010), UV absorbers, activators, curing agents, stabilizers such as carbodiimide, colorants, neutralizing agents, thickeners, non-reactive and reactive plasticizers, coalescing agents such as di(propylene glycol) methyl ether (DPM) and PM acetate, waxes, slip and release agents, antimicrobial agents, surfactants such as ionic and nonionic surfactants (e.g., Pluronic™ F68-LF, IGEPAL™ CO630) and silicone surfactants, metals, salts, antiozonants, and the like.

Blends with Other Polymers and Polymer Dispersions. The polymers of this invention can be combined with commercial polymers and polymer dispersions by methods well known to those skilled in the art.

The polymer may be applied as a dispersion in a media to form a coating, adhesive, sealant, etc. It may be applied by brushing, dipping, flow coating; spraying, rolling, etc. It may contain conventional ingredients such as solvents, plasticizers, pigments, dyes, fillers, emulsifiers, surfactants, thickeners, theology modifiers, heat and radiation stabilization additives, defoamers, leveling agents, anti-cratering agents, fillers, sedimentation inhibitors, U.V. absorbers, antioxidants, flame retardants, etc. It may contain other polymeric species such as additional polymers in the forms of blends, interpenetrating networks, etc.

In one embodiment, the polymerization temperature is 0 to about 100 or 150° C. preferably 5 to about 95° C. and more preferably about 10 to about 90° C. In one embodiment, the reactor pressure after charging the monomers and during polymerization is from atmospheric pressure (about 1 atmosphere) to about 10 atmosphere, more desirably from about atmospheric to about 2 or 3 atmosphere. In one embodiment, it is desirable that a conventionally equipped acrylate polymerization vessel designed for use at 1 or 2 atmospheres could be used so that equipment costs would not be a determent to using this technology.

In one embodiment, desirably the pH of the polymerization media would be from about 1 to about 10, more desirably from about 1 to about 7, more desirably from about 2 to about 5. In one embodiment, emulsifiers/dispersants/surface active molecules, to the extent necessary, would be chosen so that they performed any necessary function at the desired or selected pH.

In one embodiment, the polymerization media can be about any media that doesn't negatively interact with the monomers, initiators, and other components to the polymerization, and in particular including small or large amounts of water. Organic solvents (both polar and nonpolar) may be present but generally are not required. In one embodiment, the polymerization media is desirably at least 100 or 500 ppm or 1, 2, 5, 10, 15, or 20 to about 30, 50, 70, 80, 90 or 99 wt. % water based on the continuous media/aqueous media and any dispersed phase therein, e.g., monomers, surfactants, initiators, chain transfer agents, Lewis or Brönsted acid, copolymers, etc. Water, to the extent present, can be from any source, e.g., de-ionized, distilled, city water, etc.

In one embodiment, the copolymers from this process desirably have a number average molecular weight in excess of 2,000; more desirably in excess of 3,000 or 5,000; and in other embodiments desirably in excess of 10,000; 25,000; 50,000; or 100,000 grams per mole. Molecular weights as stated will be determined by GPC analysis using polystyrene standards. Molecular weights from about 25,000 and higher often typical of emulsion polymerization. Typically, the weight average molecular weight of many polymers and polymerization mechanism will be about double the number average molecular weight. In one embodiment, desirably these copolymers will have a weight average molecular weight in excess of 4,000; more desirably in excess of 6,000 or 10,000; and in other embodiments desirably in excess of 20,000; 50,000; 100,000; or 200,000 grams per mole. These molecular weights may be claimed in combination with emulsion polymerization mechanisms.

The polymerization mechanism can be any of those known to the art (e.g., dispersion, emulsion, bulk, solution, etc). In one embodiment, it is desirable for ease of handling of the polymer that the final copolymer (e.g., in aqueous media) be a dispersion that can be pumped and handled as a liquid. It is desirable that the number average particle size be below 5 microns, more desirable below 1 micron, and in some embodiments less than 800, less than 500; less than 300, or less than 200 nanometers in diameter. The particles sizes of less than 500 nanometers and below are typical of emulsion polymerization and may be claimed in combination with an emulsion type polymerization mechanism.

Typically, one wants both co-monomers and the optional co-monomers to be chemically bonded into the same polymer chain, unless one wants an interpenetrating polymer network of two separate polymers. The copolymers can have randomly inserted monomers, alternating insertion of monomers, blocky insertion of repeating units from a single monomer, etc. As one goes from blocky insertion to random to perfectly alternating insertion, the percentage of any first type of repeating unit adjacent to another type of repeating unit increases. In one embodiment, desirable at least 5, 10, 15 or 20 weight percent of the copolymer are the sum of a) repeating units from said ethylenically unsaturated olefin covalently bonded to at least one repeating unit from said ethylenically unsaturated monomer with electron withdrawing group (or carbonyl or nitrogen containing group) with b) repeating units from said ethylenically unsaturated monomer with electron withdrawing group covalently bonded to at least one repeating unit derived from said ethylenically unsaturated aliphatic olefin. In one embodiment, desirably at least 5, 10, 15 or 20 weight percent of the repeating units from said ethylenically unsaturated monomer with electron withdrawing group are covalently bonded to at least one repeating unit from said ethylenically unsaturated olefin. Similarly, in one embodiment, desirably at least 5, 10, 15 or 20 weight percent of the repeating units from said ethylenically unsaturated olefin are covalently bonded to repeating units from said, ethylenically unsaturated monomer with electron withdrawing groups.

While not wishing to be bound by theory, the mechanism by which this co-polymerization takes place is postulated to involve sequential formation of electron poor and electron rich terminal end groups on the growing polymer resulting from alternating addition of olefin and acrylate.

A unique feature of many of the examples in this invention is that generally in the NMR analysis of polymers from this process, alternating sequences of the a) ethylenically unsaturated aliphatic olefin with 4-30 carbon atoms with the b) at least one ethylenically unsaturated monomer containing an electron withdrawing group (alternately defined in some claims as an ethylenically unsaturated monomer containing a carbonyl or nitrogen group) exist in the copolymer, often along with sequences or blocks of the b) monomer. The presence of both alternating sequences of the two types of monomers and homopolymer blocks within the same reaction product seems unique, In on embodiment, it is desirable that at least 2, 5, 10, or 20 mole percent of all the repeating units in the copolymer are the sum of said a) ethylenically unsaturated aliphatic olefin with 4 or 5 to 30 carbon atoms covalently bonded to at least one of said b) at least one ethylenically unsaturated monomer containing an electron withdrawing group (alternately defined in some claims as an ethylenically unsaturated monomer containing a carbonyl or nitrogen group) combined with said b) at least one ethylenically unsaturated monomer containing an electron withdrawing group (alternately defined in some claims as an ethylenically unsaturated monomer containing a carbonyl or nitrogen group) covalently bonded to at least one of said a) ethylenically unsaturated aliphatic olefin with 4 or 5 to 30 carbon atoms. Alternatively, in another embodiment (or in combination with the limitations above characterizing said alternating sequences), at least 2, 5, 10, or 20 mole percent of all the repeating units in the copolymer are the sum of said b) at least one ethylenically unsaturated monomer containing an electron withdrawing group (alternately defined in some claims as an ethylenically unsaturated monomer containing a carbonyl or nitrogen group) covalently bonded to repeat units from monomers other than said a) ethylenically unsaturated aliphatic olefin with 4 or 5 to 30 carbon atoms (e.g., the copolymers have the specified amount of blocks of said b) at least one ethylenically unsaturated monomer containing an electron withdrawing group (alternately defined in some claims as an ethylenically unsaturated monomer containing a carbonyl or nitrogen group) not alternating with said a) a) ethylenically unsaturated aliphatic olefin with 4 or 5 to 30 carbon atoms.

The copolymer product can be used in OEM (original equipment manufacturing) plastics including automotive and consumer electronics; weatherable coatings for building and the construction industry, textile coatings for home furnishings and automotive, printing inks and primers for flexible packaging. It may be used as a dispersion in aqueous media or precipitated to isolated the polymer (e.g., as a dry powder, bulk polymer, or slurry) and used as an additive, impact modifier, etc. for another plastics. It is particularly useful in applications requiring additional hydrophobic character in coatings, primers, inks, compatibilizers, adhesives, sealants, caulks, textile coatings, and composite materials. The copolymers could be used in personal care, pharmaceutical or pharmacologically active formulations to change the feel, viscosity, surface character, delivery mechanism, etc. of such formulations.

EXAMPLES

Chemicals Used in Examples

Comparative Example 1

Baseline emulsion polymerization without DIB and catalyst.

TABLE 1

Reactants for Subsequent Tables

|   | CMP Name | Chemical Name | Source |
|---|---|---|---|
| 1 | Rhodaplex EST-30 | | Rhodia |
| 2 | Methyl Methacrylate | MMA | J T Baker |
| 3 | Butyl Acrylate | BA | |
| 4 | Methacrylic Acid | MAA | Aldrich |

Purpose: to prepare a latex emulsion polymer. Preparation:
1. Monomer pre-emulsion preparation:
   a. 0.51 g sodium bicarbonate was added to a beaker followed by 51 g water and 1.7 g EST-30. The mixture was blended with a spatula until homogeneous and then added to an addition funnel equipped with an overhead stirrer with a glass shaft and crescent shaped Teflon blade.
   b. The three monomers MMA, BA and MAA were added to the addition funnel while mixing after each addition. A milky white emulsion formed.
   c. The emulsion was continuously stirred to maintain the emulsion.
2. Initial reactor charge
   a. 0.17 g sodium bicarbonate was added to a beaker followed by 110.5 g water and 1.7 g EST-30. The mixture was blended with a spatula until homogeneous and then added to a 1 L 4-neck, flask.
   b. The flask was equipped with an overhead stirrer with a glass shaft and crescent shaped Teflon blade, thermocouple, condenser and $N_2$ inlet.
   c. The stirring rate was set at 200 rpm.
3. Reaction
   a. The contents of the reactor were heated to 78° C.
   b. Initiator I solution was prepared (0.17 g sodium persulfate and 3.4 g water) and added all at once to the reactor.
   c. The monomer pre-emulsion was added to the flask over 3 hours via addition flannel.
   d. 45 minutes after the monomer pre-emulsion addition started, the initiator II solution (0.51 g sodium persulfate and 17 g water) addition was started, The initiator II solution was added over 3 hours using, an addition funnel.
   e. Upon completion of the monomer pre-emulsion, the addition funnel was rinsed with 8.5 g of water (in three portions).
   f. Upon completion of the initiator 11 solution, the reaction was held at 78° C. for 1.5 hours then cooled.
   g. The milky-white reaction liquid was filtered through a cloth pad. 341.81 g milky-white liquid filtrate (product) was collected. A small amount (1.57 g) of white solids stuck to the stirring shaft, thermocouple, and flask.

Comparative Example 2

Emulsion polymerization baseline with DIB (diisobutylene) and no catalyst.

The procedure for this experiment was the same as for Comparative Example 1 except that 34.69 g of DIB was added to the reactor and the BA charge was reduced to 39.70 g (see formulations in Table 2).

Example 3

Emulsion polymerization with DIB and Amberlyst 35 catalyst.

The procedure for this experiment was the same as for Comparative Example 2 except that 30 g of wet Amberlyst 35 (50 wt % water) was added (see formulations in Table 2).

TABLE 2

Emulsion Polymer Formulations

| Example | | Comp Ex 1 | Comp Ex 2 | Ex 3 |
|---|---|---|---|---|
| Monomer Premix | Water | 51.00 | 51.00 | 51.00 |
| | Rodapex EST-30 | 1.70 | 1.70 | 1.70 |
| | Sodium bicarbonate | 0.51 | 0.51 | 0.51 |
| | MMA | 88.4 | 88.4 | 88.4 |
| | BA | 79.39 | 39.70 | 39.70 |
| | MAA | 2.21 | 2.21 | 2.21 |
| | Rinse water | 8.50 | 8.50 | 8.50 |
| Reactor Charge | Water | 110.50 | 110.50 | 110.50 |
| | Sodium bicarbonate | 0.17 | 0.17 | 0.17 |
| | Rodapex EST-30 | 1.70 | 1.70 | 1.70 |
| | Diisobutylene (DIB) | | 34.69 | 34.69 |
| | Amberlyst 35 | | | 15.00 |
| Initiator I | Water | 3.40 | 3.40 | 3.40 |
| | Sodium persulfate | 0.17 | 0.17 | 0.17 |
| Initiator II | Water | 17.00 | 17.00 | 18.00 |
| | Sodium persulfate | 0.51 | 0.51 | 0.51 |
| | Yield | 341.80 | 347.01 | 272.96 |
| | Solids (wet) | 1.57 | | 32.00 |
| | Theory yield (less solid cat) | 365.16 | 360.16 | 361.16 |
| | % Yield | 93.6 | 96.3 | 75.6 |
| | Product appearance | milky white | milky pale blue | milky white |
| | % Solids exp | 46.00 | 36.75 | 40.50 |
| | % Solids theoretical | 47.20 | 46.50 | 46.50 |
| | % Solids if no DIB incorporated. | 47.20 | 36.80 | 36.80 |
| | Dried film appearance | clear | clear | clear pale golden |
| GC Latex | MMA (ppm) | 368 | 18136 | 883 |
| | BA (ppm) | 0 | 27957 | 777 |
| | DIB (ppm) | 0 | 80243 | 55615 |
| | % DIB | 0.00 | 8.02 | 5.56 |
| | % DIB charged | 0 | 9.60 | 9.60 |
| | DSC Tg, C (major) | 24 | 64 | 54 |

Comparing the % solids and Gas Chromatograph results for Examples 2 and 3 in Table 2, higher % solids and more DIB conversion occurred when the Amberlyst 35 was used.

Comparing the DSC data, Example 3 has a lower Tg compared to Example 2. This is consistent with DIB incorporation since it is expected that the incorporation of DIB would lead to "softer" polymer films.

TABLE 3

Emulsion Polymer Formulations

| Example | | Example 4 | Example 5 |
|---|---|---|---|
| Monomer Premix | Water | 33.22 | 33.00 |
| | Rodapex EST-30 | 1.10 | 1.12 |
| | Sodium bicarbonate | 0.33 | 0.33 |
| | MMA | 0 | 0 |
| | BA | 108.46 | 107.80 |
| | MAA | 1.43 | 1.30 |
| | Rinse water | 8.05 | 8.05 |
| Reactor Charge | Water | 160.58 | 160.54 |
| | Sodium bicarbonate | 0.17 | 0.18 |
| | Rodapex EST-30 | 0.87 | 0.86 |
| | Igepal CO-850 | 0.87 | 0.86 |
| | Aerosol OT-75 | 0.86 | 0.87 |
| | Diisobutylene (DIB) | 33.7 | 0 |
| Initiator I | Water | 3.48 | 3.42 |
| | Sodium persulfate | 0.18 | 0.18 |

TABLE 3-continued

Emulsion Polymer Formulations

| | Example | Example 4 | Example 5 |
|---|---|---|---|
| Initiator II | Water | 19.11 | 18.04 |
| | Sodium persulfate | 0.53 | 0.51 |
| | Yield | 356.60 | 328.30 |
| | Solids (wet) | 1.07 | 2.01 |
| | Theory yield (less solid cat) | 373.49 | 337.32 |
| | % Yield | 92.8 | 93.4 |
| | Product appearance | milky white | milky white |
| | % Solids exp | 34.90 | 33.10 |
| | % Solids theoretical | 39.50 | 33.40 |
| | % Solids if no DIB incorporated. | 30.40 | 33.40 |
| | Dried film appearance | clear | clear |
| GC Latex | BA (ppm) | 5045 | 7470 |
| | DIB (ppm) | 7494 | 0 |
| | % DIB | 0.75 | 0 |
| | % DIB charged | 9.02 | 0 |

TABLE 4

Other similar polymerization experiments using different Lewis or Brönsted acids where % solids analysis indicated DIB (diisobutylene) incorporation.

| Example | Catalyst | % solids exp | % solids theory | % solids if no DIB incorp. |
|---|---|---|---|---|
| Example 6 | Iron naphthenate | 22.30 | 25.36 | 20.19 |
| Example 7 | Amberlyst 35 dried | 22.30 | 25.36 | 20.19 |
| Example 8 | Amberlyst 35 dried | 21.33 | 25.36 | 20.19 |
| Example 9 | Scandium triflate | 21.33 | 25.36 | 20.19 |
| Example 10 | Amberlyst 35 dried | 21.00 | 24.44 | 19.49 |
| Example 11 | AMPS | 24.00 | 27.10 | 22.02 |
| Example 12 | Amberlyst 35 dried | 31.80 | 29.38 | 43.60 |

AMPS is acryamido (2-methyl propane sulfonic acid) sodium salt or acid available from Lubrizol Advanced Materials, Inc. in Cleveland, Ohio.

Samples of coatings from Examples 4 (with DIB) and Example 5 (without DIB) from Table 3 were tested to see if the presence of DIB in the polymer promoted adhesion to a variety of thermoplastic olefin (TPO), high density polyethylene (HDPE), low density polyethylene (LDPE), and polypropylene (PP) substrates. The actual peel test was done by pulling for 5 second at 40 in/min speed with an IMASS TL-2200 Slip/Peel tester, Due to the low surface energy of TPO, PP, and PE substrates, the liquid latex films (from Examples 4 and 5 will crawl on those substrates during film drying process. Cheese cloth method is a good way to prevent the polymer from crawling during the film formation. The latex polymers were tested as they existed without any added polymers, pigments, dispersants, etc. There is no need to add extra surfactants to help film spread. Four layers of cheese cloth (1"×10") were put on the test various substrates (3"×6"), and the cloth was saturated with latex polymer (about 5 grams). The latex polymers were dried 7 days before the peel tests were run. The results are reported in Tables 5a through 5e.

TABLE 5

(substrates a-e).
Peel Strength Test - After 1 week (dry films)

| | Latex Example 4, with DIB | Latex Example 5, without DIB |
|---|---|---|
| 5a Substrate: TPO-Solvax DEXFLEX D161-LC-3 55031A (lot 1318413) | | |
| Peel Strength | 1416 | 75.4 |
| Peak Peel Strength | 1909.4 | 174.4 |
| Static Peel Strength | 1368.5 | 131.4 |
| 5b Substrate: TPO-Solvax Sequel 2330 code 54881TR (lot 2350711) | | |
| Peel Strength | 1331.8 | 109.7 |
| Peak Peel Strength | 1841.9 | 214.6 |
| Static Peel Strength | 1155.2 | 167.4 |
| 5c Substrate: HDPE-Dow DMDA 8097NAT (lot SD0844Q72G) | | |
| Peel Strength | 525 | 79.7 |
| Peak Peel Strength | 680 | 129.8 |
| Static Peel Strength | 715.8 | 85.2 |
| 5d Substrate: LDPE-Dow PE722NT (lot SC01015151) | | |
| Peel Strength | 591.9 | 56.6 |
| Peak Peel Strength | 602.8 | 112.1 |
| Static Peel Strength | 619.1 | 67.1 |
| 5e Substrate: PP-A. Schulman Polyfort 1948HU315 (lot A0143342) | | |
| Peel Strength | 1474.1 | 214.8 |
| Peak Peel Strength | 1683.3 | 307.4 |
| Static Peel Strength | 1496.4 | 250.2 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as Fall within the scope of the appended claims.

The invention claimed is:

1. A polymeric reaction product from polymerizing in a media containing water with a free radical initiator source in the presence of a solid Brönsted acid a) at least one ethylenically unsaturated aliphatic olefin with 4 to 30 carbon atoms of the formula $CH_2=CR'R''$ where R' is a linear or branched $C_1$ to $C_{28}$ alkyl that may be linear, branched or cyclic and R" is hydrogen or a linear or branched alkyl as set forth for R', with the proviso that R' and R" together have no more than 28 carbon atoms with b) at least one ethylenically unsaturated monomer containing an electron withdrawing group, and c) optionally with other ethylenically unsaturated monomers forming a copolymer comprising repeating units within the same copolymer from said olefin and said monomer containing an electron withdrawing group.

2. The polymeric reaction product according to claim 1, wherein said copolymer is polymerized is in the form of an emulsion or dispersion of said copolymer in said media and wherein said media is characterized as an aqueous media.

3. The polymeric reaction product according to claim 2, wherein said copolymer is present at a concentration of from about 5 to about 80 weight percent copolymer based on the total weight of the reaction product in said aqueous media.

4. The polymeric reaction product according to claim 3, wherein said aqueous media comprises at least 50 weight percent water.

5. The polymeric reaction product of claim 2, wherein said copolymer has a number average molecular weight of at least 5000 grams per mole or a weight average molecular weight of at least 10,000 grams per mole using GPC analysis and polystyrene standards.

6. The polymeric reaction product according to claim 5, wherein said copolymer is characterized by having at least 5 weight percent of the polymeric units being derived from said at least one ethylenically unsaturated aliphatic olefin with 4 to 30 carbon atoms being incorporated between and covalently bonded to polymeric units derived from polymerizing said at least one ethylenically unsaturated monomer containing an electron withdrawing group.

7. The polymeric reaction product according to claim 5, wherein at least 10 weight percent of said copolymer has a) at least 10 weight percent polymeric units derived from said at least one ethylenically unsaturated olefin with 4 to 30 carbon atoms, b) at least 10 weight percent repeating units derived from said at least one ethylenically unsaturated monomer containing an electron withdrawing group, and c) at least 5 occurrences in a single copolymer where a polymeric unit from said at least one ethylenically unsaturated aliphatic olefin of 4 to 30 carbon atoms is covalently bonded to a polymeric unit from said at least one ethylenically unsaturated monomer containing an electron withdrawing group.

8. A process for copolymerizing ethylenically unsaturated aliphatic olefin with ethylenically unsaturated monomer containing an electron withdrawing groups into a copolymer comprising:
  a) free radically copolymerizing in an aqueous medium at least one ethylenically unsaturated aliphatic olefin monomer with 4 to 30 carbon atoms of the formula $CH_2=CR'R''$ where R' is a linear or branched $C_1$ to $C_{28}$ alkyl that may be linear, branched or cyclic and R'' is hydrogen or a linear or branched alkyl as set forth for R', with the proviso that R' and R'' together have no more than 28 carbon atoms with at least one polar monomer utilizing a solid Brönsted acid to increase the incorporation rate of said olefin into said copolymer.

9. The process according to claim 8, wherein polymeric units from said at least one ethylenically unsaturated aliphatic olefin monomers with 4 to 30 carbon atoms comprises at least 10 wt. % of the resulting polymer.

10. The process according to claim 9, wherein at least 10 wt. % of said at least one ethylenically unsaturated olefin monomers which are co-polymerized are covalently bonded to a polymeric unit from an acrylate monomer in said copolymer.

11. The process according to claim 8, wherein at least 50 wt. % of said at least one ethylenically unsaturated aliphatic olefin monomers are ethylenically unsaturated aliphatic olefin monomers having from 6 to 15 carbon atoms.

12. The process according to claim 8, wherein said copolymer is characterized by a number average molecular weight in excess of 10,000 grams/mole as determined by GPC.

13. The process according to claim 8, wherein said copolymer is generated in the form of a stable emulsion or dispersion of polymer in an aqueous media.

14. The process according to claim 8, wherein said emulsion or dispersion is characterized by a volume average particle size of less than 1000 nanometers in diameter.

15. A polymeric reaction product from polymerizing in a media containing water utilizing a solid Brönsted catalyst a) at least one ethylenically unsaturated aliphatic olefin with 4 to 30 carbon atoms of the formula $CH_2=CR'R''$ where R' is a linear or branched $C_1$ to $C_{28}$ alkyl that may be linear, branched or cyclic and R'' is hydrogen or a linear or branched alkyl as set forth for R', with the proviso that R' and R'' together have no more than 28 carbon atoms with b) at least one ethylenically unsaturated monomer containing an electron withdrawing group, and c) optionally with other ethylenically unsaturated monomers forming a copolymer comprising repeating units within the same copolymer from said olefin and said monomer containing an electron withdrawing group.

\* \* \* \* \*